United States Patent [19]
Geiger et al.

[11] Patent Number: 4,493,052
[45] Date of Patent: Jan. 8, 1985

[54] METHOD AND ARRANGEMENT FOR THE MONITORED TRANSFER OF CONTROL SIGNALS AT INTERFACES OF DIGITAL SYSTEMS

[75] Inventors: Gerhard Geiger, Schliersee; Michael Strafner, Munich, both of Fed. Rep. of Germany

[73] Assignee: Siemens Aktiengesellschaft, Berlin and Munich, Fed. Rep. of Germany

[21] Appl. No.: 441,854

[22] Filed: Nov. 15, 1982

[30] Foreign Application Priority Data

Nov. 17, 1981 [DE] Fed. Rep. of Germany ...... 3145632

[51] Int. Cl.³ .............................................. G06F 1/00
[52] U.S. Cl. ................................................... 364/900
[58] Field of Search ........................ 364/900 MS File

[56] References Cited

U.S. PATENT DOCUMENTS 4,078,259  3/1978  Soulsby et al. .................. 364/900
4,241,416 12/1980  Tarczy-Hornoch ............. 364/900

OTHER PUBLICATIONS

The Programmable Floppy-Disc Controller 8271—Intel Company Component Data Catalog, Jan. 1981, particularly pp. 8-115 to 8-118.
Programmable HDLC-SDLC Protocol Controller 8273—Intel Component Data Catalog, Jan. 1981, particularly pp. 9-163 to 8-175.

Primary Examiner—Raulfe B. Zache
Attorney, Agent, or Firm—Herbert L. Lerner; Laurence A. Greenberg

[57] ABSTRACT

Method for monitored transfer of control signals at interfaces of digital systems wherein a request signal is transferred by a first system via a request line to a second system, information concerning the cause of the request signal is taken by the second system from a status register of the first system, and the status register is subsequently reset, which comprises providing the first system with both a first and a second status register; storing the information concerning the cause of the request signal in the first status register which has outputs connected to respective inputs of the second status register; connecting the second status register to the second system when a read signal delivered by the second system is present; severing the connection between the first and the second status registers during the presence of the read signal and a subsequent clock cycle of the first system; monitoring by the second system of a readout of the second status register; and resetting respective cells of the first status register after the second status register is read out, and an arrangement for carrying out the method.

8 Claims, 3 Drawing Figures

METHOD AND ARRANGEMENT FOR THE MONITORED TRANSFER OF CONTROL SIGNALS AT INTERFACES OF DIGITAL SYSTEMS

The invention relates to a method and an arrangement for the monitored transfer of control signals at interfaces of digital systems, particularly systems operating with mutually asynchronous clocks wherein a first system transfers a request signal via a request line to a second system, the second system takes the information concerning the cause of the request signal from a status, and wherein the status register is subsequently reset.

In microcomputer systems, peripheral equipment with a control unit assume tasks of data processing and data formatting and thereby relieve the central unit. These tasks encompass, for example, series/parallel conversion of data, code conversion and/or handling of data protocols. As a rule, the interface between the peripheral equipment with the control unit, on the one hand, and the central unit, on the other hand, is controlled by means of control signals, and mostly by means of "interrupt" signals. In the peripheral equipment, an event i.e. the cause of the interrupt, is detected and reported to the central unit via an "interrupt request" line.

In more complex peripheral equipment with control units, the control signal, as a rule, the "interrupt request", can be triggered by several sources, such as "data ready", "data overflow", "data transmission erro" etc., for example in this case, the central unit, after receiving an "interrupt request", reads a status register which is arranged in the peripheral module and from which it derives the interrupt cause and, accordingly, acknowledges the receipt of the interrupt request. In the peripheral equipment with the control unit, the status is reset to the starting position. The programmable floppy-disc controller 8271 from the Intel Company Data Catalog, January 1981, particularly pages 8-115 to 8-118 and the programmable HDLC-SDLC Protocol Controller 8273 from the Intel Component Data Catalog, January 1981, particularly pages 9-163 to 8-175, for example are heretofore known peripheral equipment with a control unit which operate in this manner.

Because the central unit and the peripheral module with the control unit are generally operated with different clock frequencies for reasons of technology and the structure internal to the module, since otherwise the slower module would limit the processing speed, problems arise which are typical for information transfer at asynchronous clock boundaries: An interrupt event occurs synchronously with the clock of the peripheral equipment (clock system 1), sets the status register synchronously with this clock, and thereby triggers the interrupt request. The reaction of the central unit, the reading of the status register, occurs synchronously with the clock of the central unit (clock system 2). The status register is reset again synchronously with the clock system 1. Thus, there is a finite time between the reading of the status register and the resetting in every case. Consequently, interrupt events which fall into this time interval can be reset without having been evaluated by the central unit.

It is an object of the invention to provide a remedy here and to provide a method and an arrangement for the monitored transfer of control signals at interfaces of digital systems, wherein an absence of processing of control signals, such as for example, interrupt events by a central unit, is prevented.

With the foregoing and other objects in view, there is provided, in accordance with the invention, a method for monitored transfer of control signals at interfaces of digital systems wherein a request signal is transferred by a first system via a request line to a second system, information concerning the cause of the request signal is taken by the second system from a status register of the first system, and the status register is subsequently reset, which comprises providing the first system with both a first and a second status register; storing the information concerning the cause of the request signal in the first status register which has outputs connected to respective inputs of the second status register; connecting the second status register to the second system when a read signal delivered by the second system is present; severing the connection between the first and the second status registers during the presence of the read signal and a subsequent clock cycle of the first system; monitoring by the second system of a readout of the second status register; and resetting respective cells of the first status register after the second status register is read out.

In accordance with another aspect of the invention, there is provided an arrangement for performing the method for the monitored transfer of control signals at interfaces of digital systems comprising a plurality of cells in the first status register wherein the information coming from the first system and concerning the causes of the request signal are storable; the second status register having inputs connectible with outputs of the first status register, and having outputs connectible with the second system in the presence of a read signal delivered by the second system; and a monitoring logic breaking the connection between the first status register and the second status register during a readout of the second status register and a subsequent clock pulse of the first system and monitoring whether the content of the second status register is read out by the second system and the plurality of cells of the first status register are reset if the content of the second status register is read out.

In accordance with another feature of the invention the first status register is formed of n RS flip-flops.

In accordance with a further feature of the invention the second status register is formed of n D flip-flops connectible at the input side to the outputs of the first status register during active phase of a transfer signal transferred from the monitoring logic.

In accordance with an additional feature of the invention the monitoring logic has a first flip-flop tuned by the clock of the first system, the first flip-flop having a setting input addressable by the read signal of the second system, and having a first output from which the transfer signal is able to be taken off.

In accordance with an added feature of the invention the monitoring logic has a second flip-flop timed by the clock of the first system, the flip-flop having a setting input connected to an output of a triple NOR gate, the triple NOR gate hving inputs connected to the setting input of the first flip-flop of the monitoring logic, to the first output of the first flip-flop and to a second flip-flop, the second flip-flop having a first output from which a resetting pulse is able to be taken off.

In accordance with another feature of the invention the monitoring logic has a respective double NOR gate for each of the plurality of cells of the first status register, the respective double NOR gate, having a first input addressed by the resetting pulse, and a second input connected to an output of a corresponding cell of the second status register, the respective double NOR gate having an output connected to a resetting input of a corresponding cell of the first status register.

In accordance with a concomitant feature of the invention, the systems are operable with mutually asynchronous clocks. Other features which are considered as characteristic for the invention are set forth in the appended claims.

Although the invention is illustrated and described herein as embodied in a method and arrangement for the monitored transfer of control signals at interfaces of digital systems, it is nevertheless not intended to be limited to the details shown, since various modifications and structural changes may be made therein without departing from the spirit of the invention and within the scope and range of equivalents of the claims.

The construction and method operation of the invention, however, together with additional objects and advantages thereof will be best understood from the following description of specific embodiments when read in connection with the accompanying drawings, in which.

In the figures, like elements are identified by the same reference characters.

Figure 1:
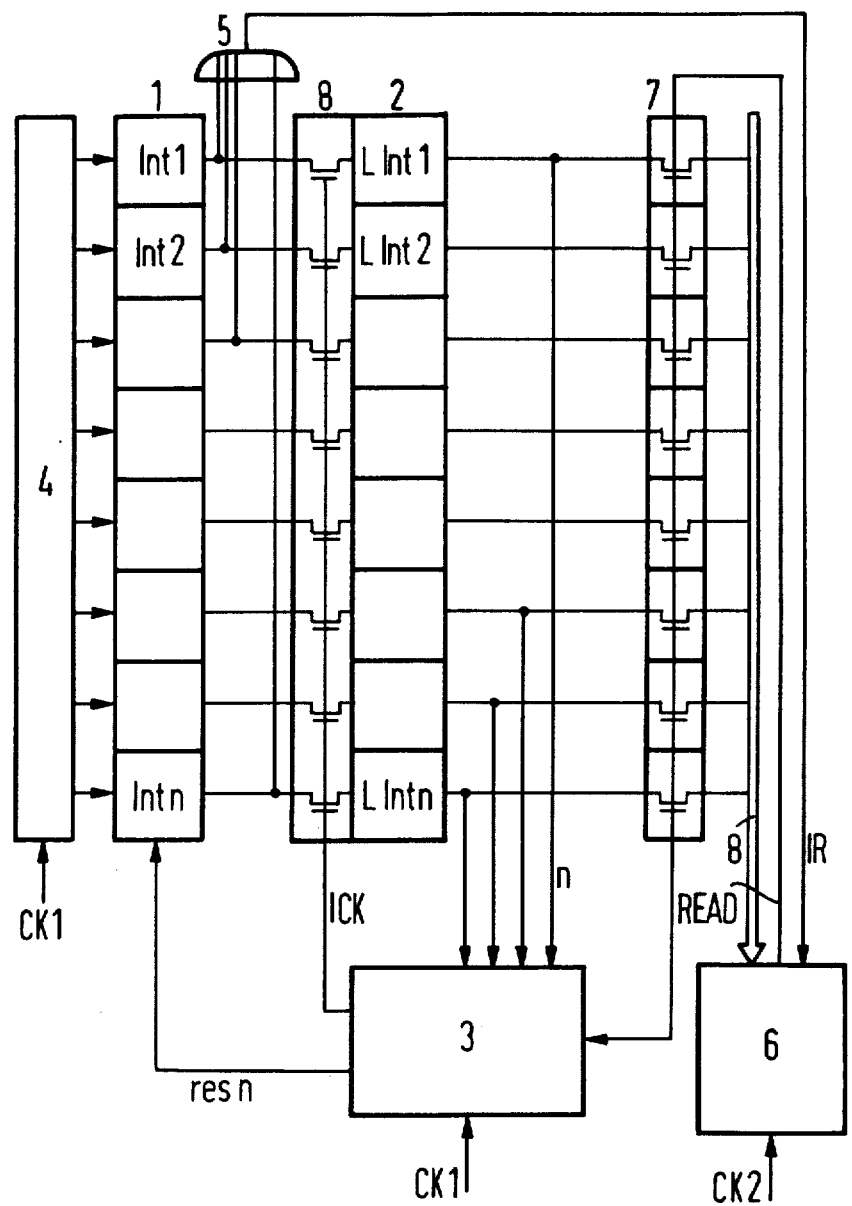
FIG. 1 is a block diagram of an arrangement for carrying out the method according to the invention.

Referring now to the drawing and first, particularly, to the block diagram of FIG. 1 thereof, there is shown therein a block structure of an arrangement according to the invention, wherein interrupt events are used as control signals. A first status register 1 has n storage cells Int 1 to Int n and stores the events which arrive synchronously with the clock CK 1 of the first system 4, for example a controller module, which results in an interrupt request IR to the second system 6, for example a central unit. The interrupt events and interrupt causes, respectively which are stored in the individual cells Int 1 to Int n of the first status register 1 may have the meaning "data ready", "transmission error", "data overflow" or something similar for example. The interrupt request IR is generated, for example, at the output of an n-fold NOR member 5, the inputs of which are connected to a respective output of a storage cell of the first status register 1.

The individual events remain stored in the first status register 1 until they are erased by a reset signal res generated by the monitoring logic 3.

The second status register 2 which operates as a transfer memory, has n memory or storage cells LInt 1 to LInt n, each memory cell of the second status register 2 being connected on the input side to the output of the corresponding storage cell of the first status register 1. On the output side, the individual storage or memory cells of the second status register 2 are coupled via a bus 38 carrying the read signal of the second system 6, so that the second status register 2 is read synchronously with the clock CK 2 of the second system 6. The second status register 2 is coupled via transfer gates 8 to the first status register 1 until the two status registers are separated by a control signal ICK delivered by the monitoring logic 3.

The transfer gate 8 is to be considered as a timing interface between the first system 4 and the second system 6, because the second status register 2 "opens" with the clock frequency CK 1 of the first system 4, and closes with the clock frequency CK 2 of the second system.

The monitoring logic 3 is designed so that it severs the connection between the first status register 1 and the second status register 2 during the read process i.e. during the active read signal READ and during the subsequent clock frequency CK1 of the first system 4; monitors the information transmitted from the second status register 2 to the bus 8 leading to the second system 6; and, in dependence thereon, clears the individual storage or memory cells in the first status register 1. The monitoring logic 3 thus prevents erasing the individual cells of the first status register 1, as long as the information of the individual storage or memory cells of the second status register 2 has not yet been read out on the bus 38, so that the interrupt request IR which represents a combination of all memory bits of the first status register 1 by means of the OR relationship brought about by the gate 5 remains until all interrupt events that have occurred and are stored in the individual storage cells of the first status register 1 have been securely transferred to the second system 6, for example, a microprocessor. Missing an interrupt cause due to a so-called race condition caused by the asynchronicity of the clock frequencies CK 1 of the first system 4 and CK 2 of the second system 6 (critical phase and time relationship, respectively) is impossible by the monitoring and the control loop closed thereby.

Figure 2:
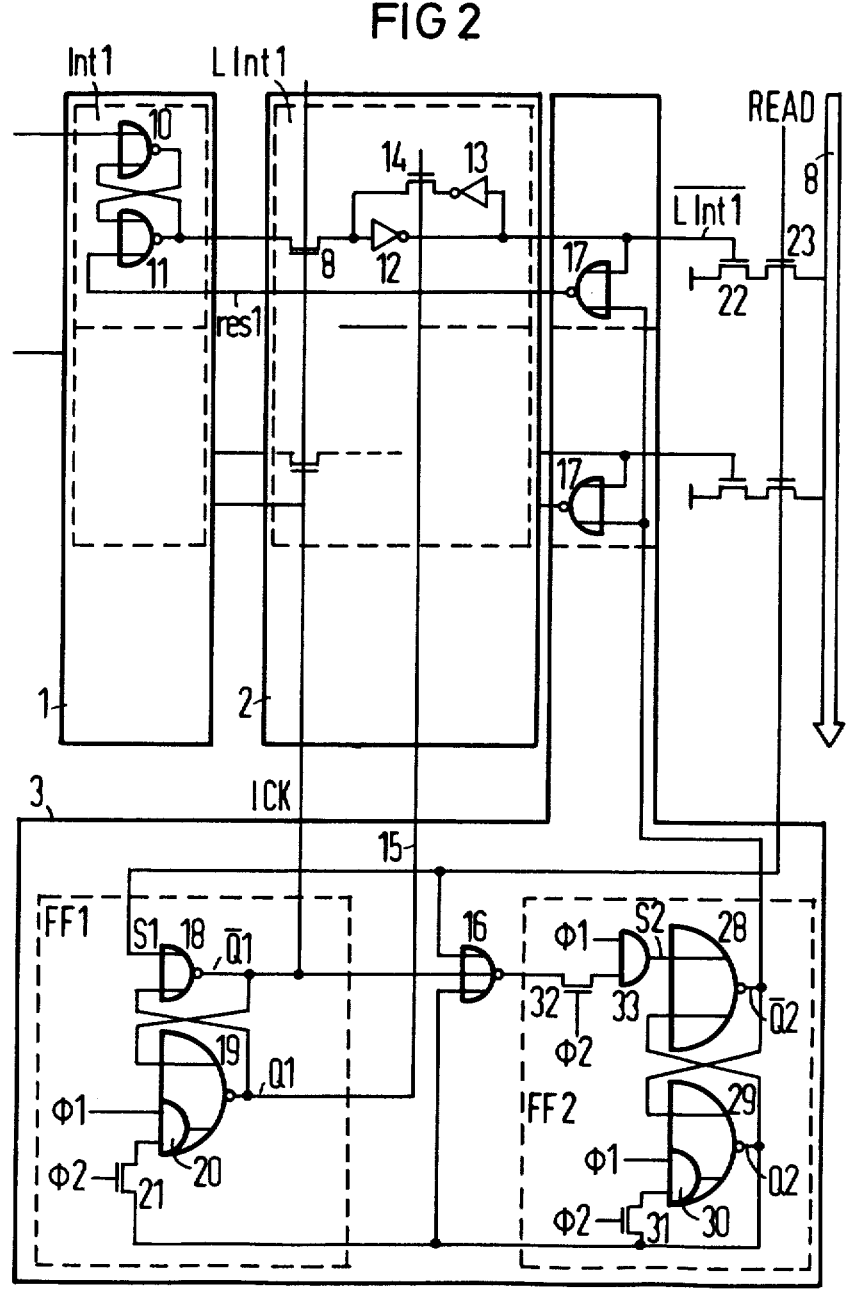
FIG. 2 is a circuit diagram of an arrangement for carrying out the method according to the invention.

FIG. 2 shows an example of a circuitwise realization of the first status register 1, the second status register 2 and the monitoring logic 3 of FIG. 1, which can be realized advantageously in MOS-technology particularly NMOS-technology. The first status register 1 is formed of n storage cells Int 1 to Int n. Each storage cell is designed as an RS flip-flop, which includes, conventionally, two fed-back NOR gates 10 and 11. For reasons of clarity, only the first of the n storage cells is shown in FIG. 1. The input of the first storage cell Int 1 connected to the first system 4 is identical with the setting input of the RS flip-flop i.e. with the first input of the NOR gate 10. The resetting input (second input of the NOR gate 11) is connected to the resetting line R coming from the monitoring logic 3. The output of the NOR gate 11 simultaneously forms the output of the storage cell Int 1 of the first status register 1.

Analogous to the first status register 1, the second status register 2 has n storage cells LInt 1 to LInt n, of which only the first storage cell LInt a is shown in FIG. 2 for reasons of clarity. The memory or storage cells of the second status register 2 are advantageously realized by so-called transparent latches, so that with the transfer gate 8 open, the output signal corresponds to the input signal without time delay caused by a clock. For this purpose, the storage cells of the second status register 2 may be designed as D flip-flops. In the exemplary embodiment of FIG. 2, a storage cell LInt 1 of the second status register is formed of a transfer gate 8 controlled by a control signal ICK delivered by the monitoring logic 3 (dynamically considered, a transfer gate acts like a D flip-flop), which passes the signal present at the input of the storage cell on to an inverter 12, the output of which is identical with the output of the storage cell LInt 1. The output signal LInt 1 of the storage cell LInt 1 therefore corresponds to the inverted input signal of the cell LInt 1. For refreshing purposes, the output of the converter 12 is connected to the input of the latter via a further inverter 13 and a further transfer gate 14 which is controlled by a signal 15 delivered by the monitoring logic 3.

The monitoring logic 3 is realized by two flip-flops FF1 and FF2, a triple NOR gate 16 and n double NOR gates 17. The flip-flop FF1 is formed, for example, of a NOR gate 18 and a further NOR gate 19, the first input (setting input) S1 of the NOR gate 18 being addressable by the read signal READ delivered by the second system 6; the second input of the gate 18 is connected to the output Q1 of the gate 19; and the first input of the gate 19 is addressed by the output Q1 of the gate 18. The second input (resetting input) of the NOR gate 19 is connected to the output of an AND gate 20, the one input of which is addressed by the clock signal $\phi1$, and the second input of which is addressed, via a transfer gate 21 controlled by the clock signal $\phi2$, by the third input of the triple NOR gate 16 and by the flip-flop FF2.

The second input of the gate 16 is connected to the output $\overline{Q1}$ of the gate 18 from which also the signal ICK can be taken, while the first input of the gate 16 is addressed by the read signal READ. The refresh signal 15 can be taken from the output Q1 of the gate 19 of the flip-flop FF1.

The second flip-flop FF2 has two NOR gates 28 and 29 which are fed back analogously in both NOR gates 18 and 29 of the first flip-flop FF1. The first input (setting input) S2 of the gate 28 is connected to the output of an AND gate 33, one of the inputs of which is addressed by the clock signal $\phi1$ and the second input of which is connected, via a transfer gate 32 controlled by the clock signal $\phi2$, to the output of the triple NOR gate 16. The second input (resetting input) of the gate 29 is connected to the output of an AND gate 30, the first input of which is addressed by the clock signal $\phi1$ and the second input of which, via a transfer gate 31 controlled by the clock frequency $\phi2$, to the output Q2 of the gate 29 and, via transfer gate 21, to one input of the AND gate 20 of the first flip-flop FF1.

The output $\overline{Q2}$ of the gate 28 of the second flip-flop FF2 is connected respectively to one output of the n double NOR gates 17, the other input of which is connected to the output of the storage or memory cell, belonging to the corresponding gate 17, of the second status register 2. The reset signal R can be taken from the output of the gate 17 and fed to the resetting input of the corresponding storage cell of the first status register 1. The clock signals $\phi1$ and $\phi2$ are derived, as non-overlapping clock signals in the manner customary in MOS-technology, from the click CK1 of the first system 4 (note, for example, C. Mead and L. Conway, Introduction to VSLI Systems, Addison-Wesley, 1980, Pages 229 to 233).

The output of the storage cells of the second status register 2 can be connected to the bus 38 of the second system 6 in such a manner that it controls a transfer gate 22 which is connected on the one side to ground and on the other side to a transfer gate 23 which is connected to the bus 38 and is controlled by the read signal READ of the second system 6.

Figure 3:
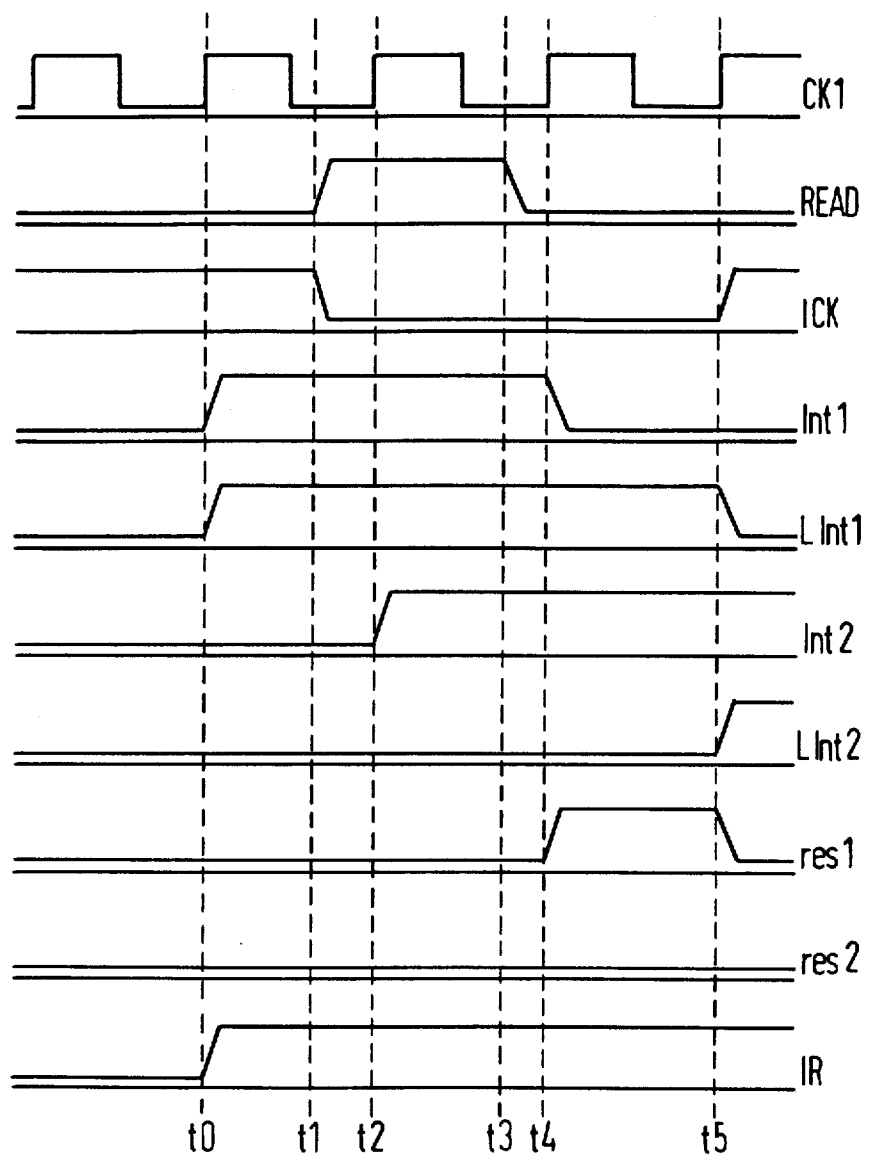
FIG. 3 is a timing diagram of an arrangement according to FIG. 1 or FIG. 2.

The operation of the exemplified embodiment of FIG. 2 is clarified hereinafter with reference to the timing diagram shown in FIG. 3: At the starting point t0, an interrupt event (Int 1) occurs synchronously with the clock signal CK 1 of the first system 4. Because the first flip-flop FF1 and the second flip-flop FF2 are reset in the starting condition, the control signal ICK is active, so that the first status register 1 and the second status register 2 are connected to one another. At the time t0, the interrupt event is therefore stored in the storage or memory cell Int 1 of the first status register 1 and the storage or memory cell LInt 1 of the second status register 2. Synchronously with the clock CK 2, the second system 6, for example, a microprocessor, accesses the second status register 2 and the cell LInt 1 with a read command READ at the time t1. The first flip-flop FF1 is set and the status registers 1 and 2 are separated. The content of the storage or memory cell LInt 1 of the second status register 2 is read-out onto the bus 38. After the end of the read signal READ (time t3), the second flip-flop FF2 is set synchronously with the clock CK'1 (time t4) and so remains for one period of the clock CK 1 (up to the time t5). The output signal $\overline{Q2}$ of the gate 28 therefore corresponds to the inverted signal of the signal res 1. With the positive-going flank of the signal READ, the two status registers 1 and 2 are therefore separated by the signal READ (t1 to t5) until the negative-going flank which is phased-in or synchronized with the clock signal CK 1.

By the logical NOR connection carried out by means of the gate 17 of the information read-out on the bus 38, the read-out information LInt 1 is monitored with a timing reset signal Q2 (Q2 corresponds to res 1) which is active during the time t4 to t5 and is taken from the output of the gate 28 of the second flip-flop FF2, and depending thereon, the corresponding status flip-flop Int 1 in the first status register 1 is reset individually with the reset signal res 1. After the time t5, the just reset flip-flop FF1 and FF2 can be set again, the status registers 1 and 2 are connected to each other and the starting state is reached again. The signal res n is therefore active only if an interrupt event was stored in the storage cell LInt n and a read signal READ had occurred and was terminated. The signal res n is phased-in with the clock signal CK 1 of the first system.

The marked advantage of this solution is that sequentialy occurring interrupt events remain stored individually until they are evaluated by the second system 6. This is assured also for the case wherein the interrupt events fall into the time interval in which interrupt events preceding in time are read out (time t0 to t5). If, for example, a further interrupt event falls into the time interval t0 to t5 (time t2), it is stored, for example in the memory Int 2 of the first status register 2, but transferred only after the completion of the evaluation of the preceding interrupt event transferred into the memory LInt 2 of the second status register 2 (time t5); the storage cell Int 2 of the first status register 1 is not reset (resetting signal res 2).

The method according to the invention is also applicable to the transfer of control signals at the interfaces of synchronous digital systems.

The foregoing is a description corresponding to German Application No. P 31 45 632.4, dated Nov. 17, 1981, the International Priority of which is being claimed for the instant application and which is thereby made part of this application. Any discrepancies between the foregoing specification and the aforementioned corresponding German application are to be resolved in favor of the latter.

We claim:

1 Method for monitored transfer of control signals at interfaces of digital systems wherein a request signal is transferred by a first system via a request line to a second system, information concerning the cause of the request signal is taken by the second system from a status register of the first system, and the status register is subsequently reset, which comprises providing the first system with both a first and a second status register; storing the information concerning the cause of the request signal in the first status register which has outputs connected to respective inputs of the second status register; connecting the second status register to the second system when a read signal delivered by the second system is present; severing the connection between the first and the second status registers during the presence of the read signal and a subsequent clock cycle of the first system; monitoring by the second system of a readout of the second status register; and resetting respecive cells of the first status register after the second status register is read out.

2. Arrangement for performing the method for the monitored transfer of control signals at interfaces of digital systems according to claim 1 comprising a plurality of cells in the first status register wherein the information coming from the first system and concerning the causes of the request signal are storable; the second status register having inputs connectible with outputs of the first status register, and having outputs connectible with the second system in the presence of a read signal delivered by the second system; and a monitoring logic breaking the connection between the first status register and the second status register during a read out of the second status register and a subsequent clock pulse of the first system and monitoring whether the content of the second status register is read out by the second system and the plurality of cells of the first status register are reset if the content of the second status register is read out.

3. Arrangement according to claim 2 wherein the first status register is formed n RS flip-flops.

4. Arrangement according to claim 2 wherein the second status register is formed of n D flip-flops connectible at the input side to said outputs of the first status register during active phase of a transfer signal transferred from said monitoring logic.

5. Arrangement according to claim 2 wherein said monitoring logic has a first flip-flop timed by the clock of the first system, said first flip-flop having a setting input addressable by the read signal of the second system, and having a first output from which the transfer signal is able to be taken off.

6. Arrangement according to claim 5 wherein said monitoring logic has a second flip-flop timed by the clock of the firs system, said flip-flop having a setting input connected to an output of a triple NOR gate, said triple NOR gate having inputs connected to said setting input of said first flip-flop of said monitoring logic, to said first output of said first-flop and to a second output of said second flip-flop, said second flip-flop having a first output from which a resetting pulse is able to be taken off.

7. Arrangement according to claim 6 wherein said monitoring logic has a respective double NOR gate for each of said plurality of cells of the first status register, said respective double NOR gate, having a first input addressed by said resetting pulse, and a second input connected to an output of a corresponding cell of the second status register, said respective double NOR gate having an output connected to a resetting input of a corresponding cell of the first status register.

8. Arrangement according to claim 2 wherein the systems are operable with mutually asynchronous clocks.

* * * * *